July 20, 1943.    H. M. WITHEROW    2,324,895
HEAVY LOAD INDICATOR FOR WATTHOUR METERS
Filed Nov. 4, 1940    3 Sheets-Sheet 1
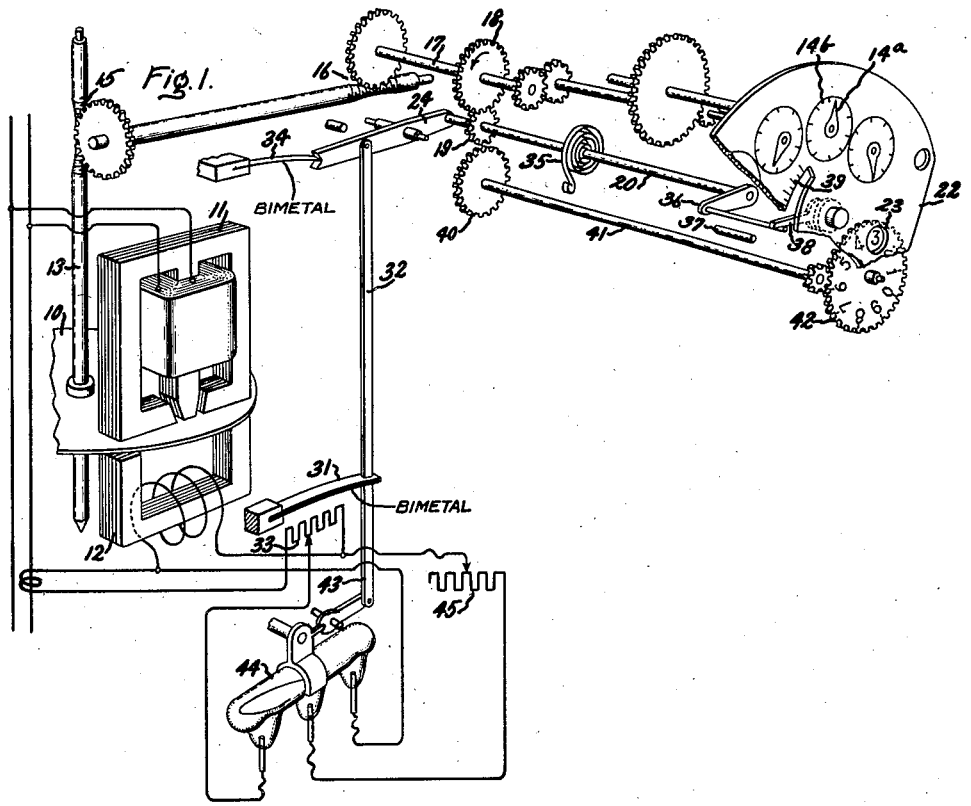
Inventor:
Harry M. Witherow,
by Harry E. Dunham
His Attorney.

July 20, 1943.  H. M. WITHEROW  2,324,895
HEAVY LOAD INDICATOR FOR WATTHOUR METERS
Filed Nov. 4, 1940  3 Sheets-Sheet 2
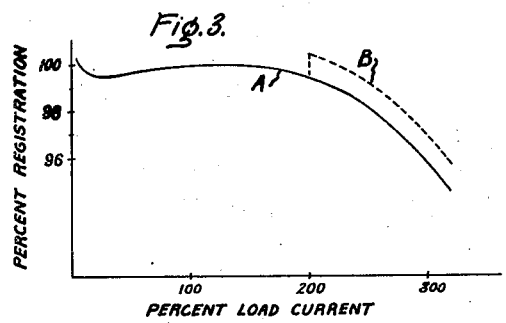
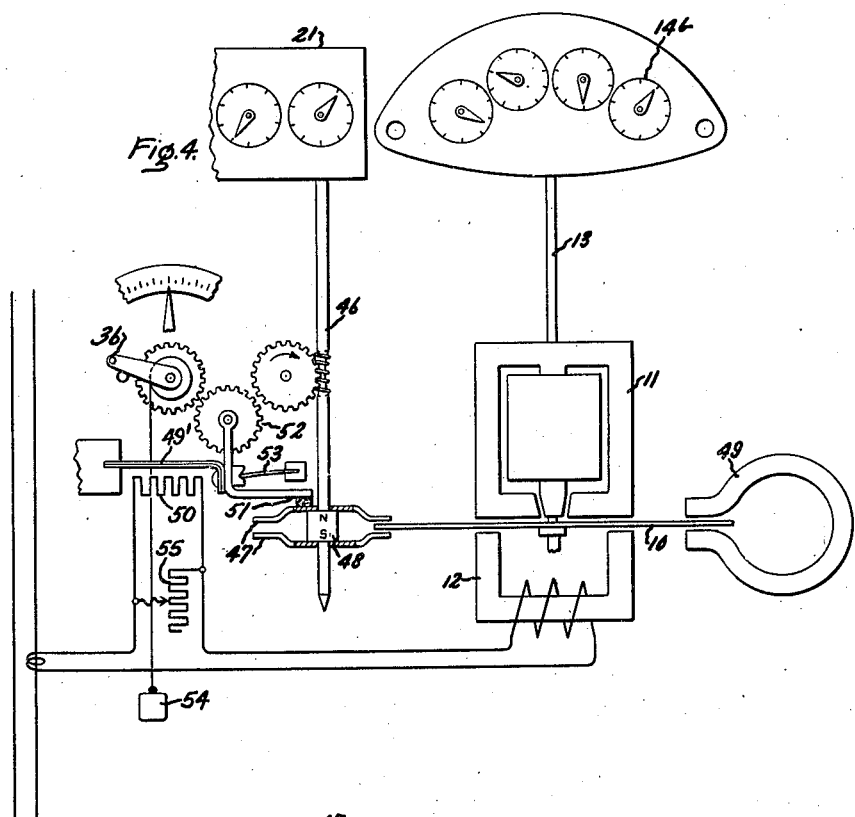
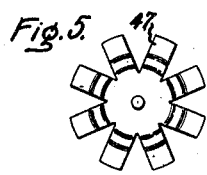
Inventor:
Harry M. Witherow,
by Harry E. Dunham
His Attorney.

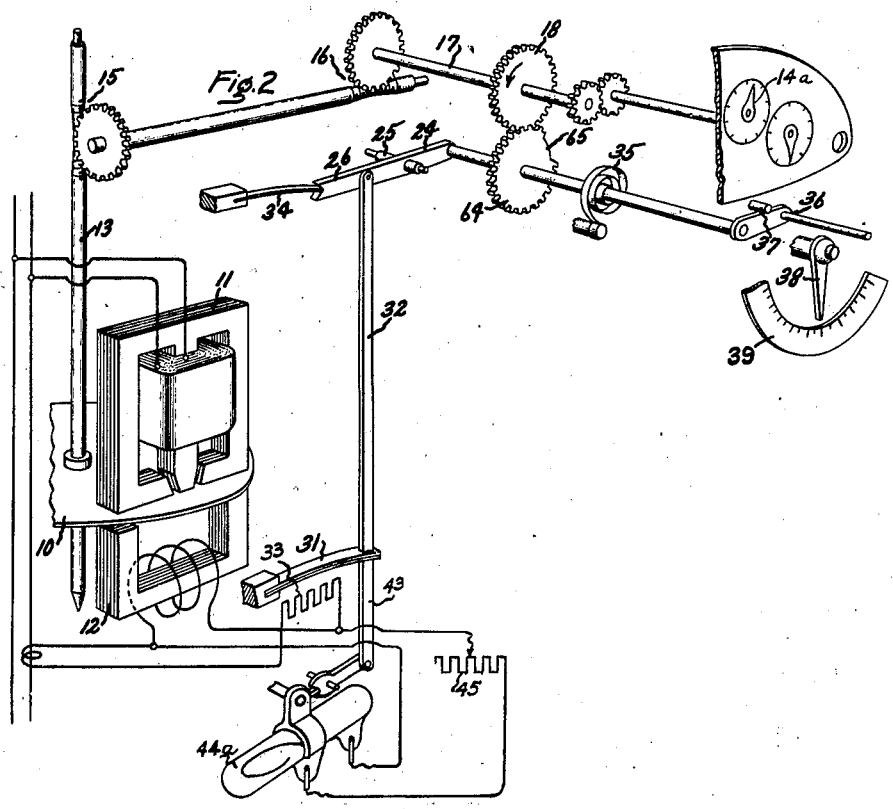

Patented July 20, 1943

2,324,895

UNITED STATES PATENT OFFICE 2,324,895

HEAVY LOAD INDICATOR FOR WATT-HOUR METERS

Harry M. Witherow, Clifton, Mass., assignor to General Electric Company, a corporation of New York Application November 4, 1940, Serial No. 364,158

4 Claims. (Cl. 171—34)

My invention relates to an attachment for electric meters of the integrating type, such for example as watthour meters and other meters of the watthour type, such as reactive component hour or volt ampere hour meters, for registering heavy load conditions. For example, my attachment may register the watthours used when the load current exceeds a predetermined amount and also the maximum watthours used at or above the predetermined load current over any continuous period of time. The measurement indications thus obtained are in the nature of demand measurements and may be used as such for billing purposes. The measurements are also useful for determining if a customer's meter or wiring is adequate for the character of load which he draws from the line. The information obtained from such measurements is also helpful in determining if a customer's rate is proper and whether or not the installation of a block interval demand meter is justified.

Although the measurements obtained by my attachment are watthour measurements, volt ampere hour measurements or reactive volt ampere hour measurements, depending on the kind of a meter the attachment is used on, the measurements are taken in response to predetermined heavy load currents. The measurements are, therefore, more useful than measurements of mere load current but the apparatus used is relatively simple and inexpensive and may be added to present type integrating meters without difficulty and without interfering with the normal purpose and operation of such meters.

The features of my invention which are believed to be novel and patentable will be pointed out in the claims appended hereto. For a better understanding of my invention reference is made to the following drawings in which Figs. 1 and 4 represent slightly different embodiments of my invention as applied to an integrating meter of the watthour type for totalizing watthours consumed when the load current is in excess of a predetermined amount. The arrangements of Figs. 1 and 4 in addition produce an indication of the maximum measurement of the integrating meter during any one continuous period of excess load current. Fig. 3 is a load current registration curve which will be referred to in explaining certain aspects of my invention; Fig. 5 is a plan view of the magnetic wheel of Fig. 4; and Fig. 2 is a further modification of my invention intended to give an indication that the high current demand has exceeded a predetermined amount.

Referring now to Fig. 1, I have shown portions of a watthour meter comprising the induction disk 10, the voltage magnet 11, current magnet 12, shaft 13, and the usual register gearing having pointers 14a connected to be driven from the shaft 13 through reduction gearing at 15 and 16 and a shaft 17. The pointers of this register cooperate with stationary dials 14b in the register face plate 27. On shaft 17 is a wheel 18 which at times may drive a wheel 19 and its shaft 20.

The wheels 18 and 19 are shifted into and out of mesh in response to the load current by a bimetallic thermal strip 31 having one end fixed and the other end coupled to lever 24 by the rod 32. The strip 31 is heated by a heater resistance 33 in series with the current coil of the meter. As strip 31 is heated it bends downward as shown to mesh wheels 18 and 19 and when cool its free end moves upward to demesh these wheels. To make these actions quick and positive and to provide ambient temperature compensation, I employ a toggle spring at 34 made of bimetal to oppose the movement caused by strip 31 in both directions until a substantial force has been built up to cause a snap action. The spring 34 also bends in response to ambient temperature changes in a direction and to the extent necessary to compensate strip 31 for such changes and cause the action to be independent of ambient temperature changes. The shaft 20 which is driven through gears 18 and 19 when in driving relation winds up a suitable spring or weight represented at 35 and also advances a dog 36 at its forward end. Dog 36 is normally biased by the spring 35 against a stop 37 but when advanced shoves a friction pointer 38 upward over a scale 39. When the gears 18 and 19 are demeshed, spring 35 returns the dog 36 counter-clockwise against stop 37 but the friction pointer 38 remains at the indication to which moved by the greatest advance of the dog. Hence pointer 38 indicates on scale 39 the maximum amount of watthours registered during any one heavy current period since the pointer 38 was last reset to zero which may be done manually by the meter reader once a month or at such other meter reading periods as seem desirable. This part of the mechanism is somewhat similar to known maximum demand meters except that the period of advance of dog 36 is not a fixed time interval but is variable and is determined by the duration of the various heavy load current cycles and is only advanced when the load current exceeds the predetermined value for which the clutch operating mechanism is adjusted. When gears 18 and 19 are disengaged, gear 19 is engaged with a gear 40 on a shaft 41 which drives a dial or dials 42 for registering the total watthours consumed during predetermined heavy load current. The driving power for register 42 is the spring 35 or equivalent in which energy is stored from the watthour meter. It is seen that because of the snap action of the gear shift, gear 19 meshes with gear 40 at substantially the same instant that it is demeshed from gear 18 so that the forward measurement advancements of gear 19 are completely transferred to and accumulated on register 42. Overshooting of such registration is prevented because stop 37 prevents any over-registration.

It will be noted that by this arrangement the watthour meter is required to provide the energy that is stored in spring 35. If the register parts are made light and delicate and are carefully adjusted so as to permit the use of a light spring at 35, this may not seriously influence the accuracy of the watthour meter. However, I may compensate for this extra load on the watthour meter and at the same time increase its useful overload range in a desirable manner.

Fig. 3 shows load accuracy curve A typical of induction watthour meters compensated for current flux damping on overload in accordance with United States Letters Patent 1,727,509, September 10, 1929. It is apparent that an additional load on such a meter such as might be caused by engaging gears 18 and 19 of applicant's Fig. 1 at 200% load current or at some greater load current would tend to increase the error in registration. Additional overload compensation for the meter is therefore desirable both for the reason explained in the above mentioned patent and because of the tendency to add load when my invention as arranged in Fig. 1 is employed.

Accordingly, I may employ the bimetallic motor means 31 for the additional purpose of stepping up the calibration of the meter when the load current reaches the point where gears 18 and 19 are engaged. One way of accomplishing this result is shown in Fig. 1 where the rod 32 has an extension 43 for operating a mercury switch 44 arranged to open resistance circuit 45 in shunt to the current coil of the meter when gears 18 and 19 are engaged. The resistance circuit 45 is so adjusted in comparison with the resistance of the current coil that when the shunt circuit is closed, the meter calibration conforms to curve A, Fig. 3. At the predetermined load current this shunt circuit is opened as shown in Fig. 1. This increases the torque. Calibration with any load added by reason of the engaging of gears 18 and 19 now conforms to the dotted line curve B, Fig. 3. It is at once apparent that this expedient greatly improves the registration accuracy of the meter over the overload range which is indicated to be between 200 and 300% load current in Fig. 3.

I may also make use of the same mercury switch 44 to shift the shunt circuit in parallel with a selected portion of heater resistance 33, thereby slightly reducing the proportion of load current flowing through the heater when gears 18 and 19 are meshed. The purpose of this is to cause the bimetallic member 31 to operate the snap action mechanism at substantially the same load current value in opposite directions with increasing and decreasing load currents. The change in calibration of the meter is adjusted by the resistance at 45 and the adjustment of the heater characteristics is made by the position along the heater 33 at which the shunt circuit is tapped thereto.

In Fig. 4 I have shown a further modification of the invention so arranged as to be added to existing meters without disturbing the customary register and with a separate drive to the heavy current responsive attachment. In this arrangement the register 21 and the maximum demand dog 36 are driven from a shaft 46 arranged to be driven from the meter disk 10 through a magnetic induction drive receiving its flux from a small permanent magnet 48. This drive merely consists of two serrated dish-shaped members 47 of magnetic material secured to the opposite poles of the axial permanent magnet 48 so as to form a magnetic wheel having opposite polarity parts which embrace the edge of the disk armature 10. A plan view of this wheel is shown in Fig. 5. If the magnetic wheel is held stationary as is the case at low and normal load currents on the meter, it serves to supply a small but constant damping flux and hence a small part of the meter damping, the greater part of which is supplied by the usual damping magnet shown at 49. In adding this attachment to an existing meter, the damping supplied by the magnet 49 will be reduced by the small amount of damping contributed by wheel 47 when held stationary. The usual adjustment for moving magnet 49 towards the shaft 13 will suffice for such recalibration.

A bimetallic strip 49' heated by the load current heater 50 is provided for operating a brake finger 51 and a gear shift 52. Mild snap action of the thermostat between its two positions is provided by a toggle spring 53.

In the position of the parts shown, it is assumed that the meter current is normal and the strip 49' in approximately a normal position with the brake finger 51 holding wheel 47 from rotation and with the gear 52 between shaft 46 and the demand attachment demeshed. Under these conditions a small weight 54 will have returned the dog 36 to zero position against its stop. When a predetermined heavy load current occurs for any length of time, the strip 49' flexes upward to remove the brake finger 51 allowing shaft 46 to be driven and at the same time engaging gear 52 completing the drive to the demand attachment. The demand attachment operates in the usual way to register the maximum rotation of shaft 46 during any one continuous heavy load current cycle. Register 21, permanently geared to shaft 46, registers the total rotations of shaft 46. It is evident that the load on shaft 46 is constant so that the registrations will be proportional to the speed of rotation of armature 10.

The release of brake 51 permitting wheel 47 to rotate reduces the drag or damping produced by wheel 47, since now the relative movement between these parts and hence the damping is reduced. Only enough damping now exists to drive the shaft 46. Hence, we have a beneficial heavy load current compensating condition that will lift the meter registration curve on overload current in a manner depicted by the dotted line curve B of Fig. 3, although this compensation is obtained in a different manner as compared to Fig. 1.

An adjustable resistance 55 in shunt to heater 50 may be used to adjust the point in the load current curve where the strip 49' will operate. I prefer also to use a resistance at 55 which has a smaller temperature coefficient than at 50 to provide ambient temperature compensation. It will be noted that in Fig. 4 the strip 49' when heated, flexes away from the heater resistance 50 and this feature may be emphasized to the extent necessary to cause the reverse operations of the strip to occur at substantially the same load current.

The arrangement shown in Fig. 2 is generally similar to that of Fig. 1 with the exception of the overcurrent registration feature. In Fig. 2 this feature is intended primarily to indicate that the watthour has exceeded a predetermined amount during some overload current period and does not necessarily show the maximum watthour registration during such overload current periods. In Fig. 2 when the load current exceeds a predetermined amount the gear 64 is thrown into mesh with gear 18 as indicated. Dog 36 is then advanced to move demand pointer 38 up scale 39 so long as the overload continues or until the blank sector 65 of gear 64 comes opposite gear 18 which occurs when the demand pointer 38 has been advanced to the upper end of the scale. Then if the overload current still persists, slipping occurs between gears 64 and 18 until the current drops and the gears are separated and dog 36 is returned to the zero stop 37 by spring 35. By this arrangement relatively low overload demands can be measured and indicated with good accuracy. Also, the apparatus is protected from damage and blocking of register 14a in case the demand exceeds the range for which the device is intended. This form of the invention is particularly useful for survey work to determine, for example, if a customer's load is such as to warrant installing a block interval demand meter. The overload accuracy compensating feature of Fig. 1 may of course be used with the modification shown in Fig. 2 and for this purpose I have illustrated a normally closed switch 44a which is opened by the bimetallic element 31 on current overload. When in the current underload condition, switch 44a is closed and is in series with a resistance 45, which may be adjusted. This circuit is shunted across the current coil of the watthour meter and consequently changes the ratio of meter current to line current when the thermal device 31 operates.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An integrating meter of the watthour type, a register driven by said meter for registering the total integration thereof, a second register means, means responsive to the increase and decrease of the load current of said meter above and below substantially a predetermined value for respectively connecting and disengaging said second register means to and from driving relation with said meter and means also operated by said current responsive means for modifying the calibration of said meter in a manner to improve its accuracy.

2. An integrating meter of the watthour type, a register continuously connected to be driven by said meter, a second register means, a driving connection between said second register means and meter which may be rendered active or inactive, means responsive to the load current of said meter for controlling said driving connection so that the second register means is driven by the meter only when the meter load current exceeds a predetermined value and means for correctively adjusting the calibration of said meter when such load current responsive controlling operations occur.

3. An integrating meter of the watthour type, a demand device, a dog for advancing said device, a drive including a pair of gears between said meter and dog which may be disengaged, said drive causing the advance of said dog when the meter is in operation and the drive is engaged, means for retracting said dog when said drive is disengaged, and means responsive to the load current of said meter for engaging said drive when the load current of the meter exceeds a predetermined value and for disengaging said drive when the load current is below such value, one of said gears containing a blank portion in its toothed portion to prevent the advance of said dog beyond a given point.

4. In an integrating meter of the watthour type, a maximum demand indicator, a shaft for operating said indicator and means responsive to the increase and decrease of the load current of said meter above and below approximately a predetermined value for respectively connecting and disengaging said shaft to and from driving relation with said meter, and means for resetting said shaft whereby said demand indicator indicates the maximum integration of said meter over the one period of greatest overload during which the load current has exceeded such predetermined value between the resetting operations of said shaft.

HARRY M. WITHEROW.